United States Patent [19]

Merz et al.

[11] 4,359,137

[45] Nov. 16, 1982

[54] SAFELOAD INDICATOR FOR AERIAL LIFT PLATFORM APPARATUS

[75] Inventors: Ernest J. Merz, Chambersburg; Charles W. Walters, Waynesboro, both of Pa.

[73] Assignee: JLG Industries Inc.

[21] Appl. No.: 154,757

[22] Filed: May 30, 1980

[51] Int. Cl.[3] .................... B66F 11/04; G01D 13/12

[52] U.S. Cl. .................... 182/2; 212/157; 116/298; 182/18

[58] Field of Search .............. 182/2, 18, 19; 212/157; 116/298, 299

[56] References Cited

U.S. PATENT DOCUMENTS

| | | | |
|---|---|---|---|
| 1,773,589 | 8/1930 | Lichtenberg | 116/298 |
| 2,374,298 | 4/1945 | Nasset | 116/299 |
| 2,569,890 | 10/1951 | Hicks | 116/299 |
| 3,011,261 | 12/1961 | Riley | 33/125 R |
| 3,122,125 | 2/1964 | Towne | 116/299 |
| 3,223,249 | 12/1965 | Cady | 212/157 |
| 3,490,015 | 1/1970 | Nixon | 340/522 |
| 3,922,789 | 12/1975 | Sarrell | 33/125 R |
| 3,961,685 | 6/1976 | Kozai | 182/19 |
| 4,052,602 | 10/1977 | Horn | 364/424 |
| 4,211,332 | 7/1980 | Pitman | 212/157 |

*Primary Examiner*—Reinaldo P. Machado

*Attorney, Agent, or Firm*—Irvin A. Lavine

[57] ABSTRACT

A workman's lift platform apparatus has a vertically swingable and extensible boom with a workman's platform at the outer end. A color coding indicating the amount of boom extension is provided on the fly section of the boom, visible to the workman in the platform, and an indicator plate having corresponding color coding is provided adjacent the controls on the platform. The indicator plate in the form of a drum is driven proportionately to the angular movement of the boom by a pair of sheathed, push-pull cables, or by a sheathed torsion cable. In other embodiments, the indicator plate is tilted in proportion to the angular movement of the boom by a sheathed push-pull cable or by a parallel bar linkage. A cursor is provided adjacent the indicator plate, and is part of a gravity-operated pendulum.

16 Claims, 7 Drawing Figures

SAFELOAD INDICATOR FOR AERIAL LIFT PLATFORM APPARATUS

BACKGROUND OF THE INVENTION

The present invention relates to safe load indicators for aerial lift platform apparatus which will enable a workman on the platform to determine the safe load at any angle of the boom and any extension of the boom.

The prior art has recognized the desirability of providing an indication of the safe load or capacity of equipment having an extensible boom which may be luffed, that is, positioned at various angles to the horizontal.

On aerial lift platform apparatus, there has been provided an extensible boom which could be luffed to various angles, and controlled from a workman's platform at the outer end of the extensible boom; the section of the boom which was at the outer end of the boom, and to which the workman's platform is attached, and known as the fly section, had applied to the upper surface color coding, to indicate the amount of extension of the fly section, and there was provided, also, a gravity-operated pendulum, positioned adjacent a quadrant-shaped indicator plate having color coded scales thereon corresponding to the color coding of the fly section; the scales were provided with numerals corresponding to various safe loads in pounds. The pendulum and plate were placed on one side of the fly section. In some positions taken by the operator, the reading of the indicator was difficult, requiring the operator to crane his neck in order to obtain a satisfactory view of the pendulum and indicator plate.

Kozai U.S. Pat. No. 3,961,685 discloses an indicator arrangement for a fire ladder which is capable of being luffed, there being provided a scale indicating the degrees of elevation of the ladder, a cursor moveable over the scale, a second scale spaced from the first scale and providing a representation of the extension of the ladder, with a cursor moveable over the second scale, there being provided between the two scales limit lines on the indicator plate to provide an indication of the maximum extension at a given angle of the ladder.

Nixon U.S. Pat. No. 3,490,015 provides a safe load indicator for a crane, and utilizes a Bowden cable to transmit angular movement of the boom to a somewhat complicated indicator apparatus mounted in the crane cab. Towne No. 3,122,125, Riley U.S. Pat. No. 3,011,261, Nasset U.S. Pat. No. 2,374,298 and Hicks U.S. Pat. No. 2,569,890 provide additional disclosures of boom angle indicators utilizing cables.

Aerial lift platform apparatus in the prior art provided with capacity indicators, although being of simple construction, were not readily visible to the operator in the platform. Where fire ladders, and the like were provided with capacity indicators, the constructions were complex, therefore being less reliable than desired, and were not always easily read and understood by the operator.

SUMMARY OF THE INVENTION

The present invention provides safe load indicators for a workman's lift platform apparatus which has a telescopic boom, pivotally mounted for luffing movement about a horizontal axis. Motors are provided for luffing and for extending the telescopic boom, and controls therefore are provided on a workman's platform positioned at the outer end of the fly section of the boom, and moveable about a horizontal axis, so as to remain horizontal, as the boom is luffed. The fly section of the boom is provided with color coding, to indicate the amount of extension of the boom, in zones, three zones being preferred. On the platform, and adjacent the controls, and therefore immediately visible to the workman in the platform, is a safe load indicator having an indicator plate which is color coded in correspondence to the color coding of the fly section. The indicator plate may be in the form of a drum, having its axis parallel to the horizontal axis on which the boom is mounted for luffing movement. The indicator drum is rotated in proportion to the amount of luffing, or angular movement about a horizontal axis, of the boom, and this is accomplished through sheathed cables. In one embodiment, a pair of sheathed cables are used, the cables being connected to the drum and to an element rotatable with the platform, when the platform rotates about a horizontal axis at the outer end of the boom. In another embodiment, the indicator drum is driven by a sheathed cable which includes a torsion cable that is connected at one end to the indicator drum, and has at the other end a pendulum weight. A cursor adjacent the drum is provided, and is of the pendulum weight type. In addition, there is provided an embodiment in which the indicator plate is arcuate, and is part of a housing which provides a support for a pendulum-weighted cursor. The entire housing is mounted for movement about a horizontal pivot parallel to the horizontal pivotal axis of the boom, and is moved angularly about the pivot axis by a sheathed, push-pull cable, or by a parallel bar linkage.

Among the objects of the present invention are the provision of safe load indicators for a workman's lift platform apparatus which are of simple construction, and which are visible to the workman in all positions and attitudes of the workman's lift platform apparatus, which are reliable in operation, and which are easily comprehended by the workman. A more particular object of the present invention is to provide such a safe load indicator in association with a workman's lift platform apparatus which has a vertical and a horizontal pivotal connection between the workman's platform and the fly section of the boom on which it is supported.

Other objects and many of the attendant advantages of the present invention will be readily understood from consideration of the following specification, the claims and drawings.

DESCRIPTION OF THE PREFERRED EMBODIMENTS

Figure 1:
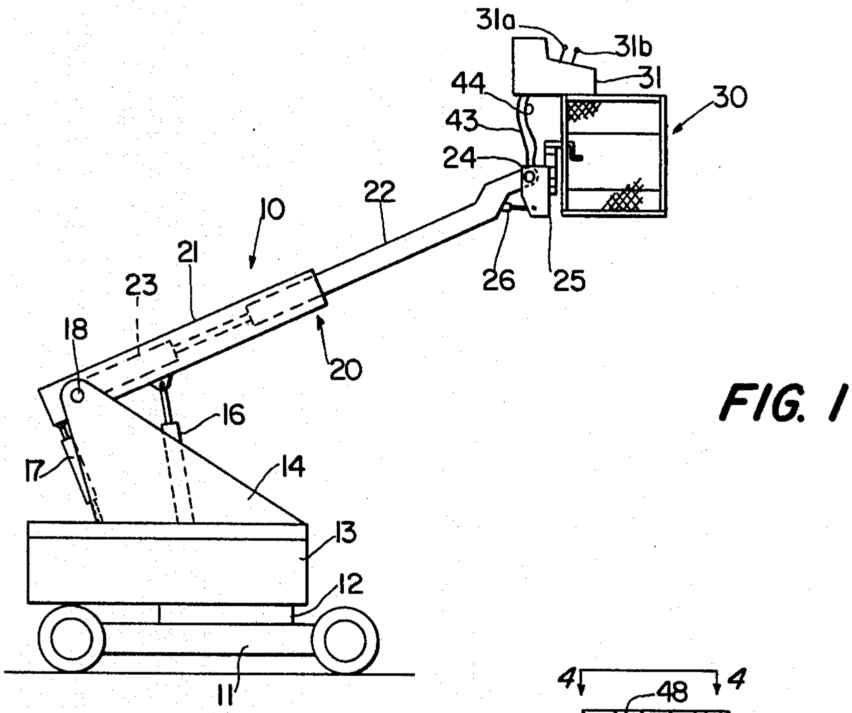
FIG. 1 is a elevational view of a workman's lift platform apparatus with a safe load indicator, in accordance with the present invention.

Referring now to the drawings, wherein like or corresponding reference numerals are used to designate like or corresponding parts throughout the several views, there is shown in FIG. 1 a workman's lift platform apparatus 10 comprising a wheeled chassis 11 having a turn table 12 for rotatably supporting an upper works 13. Upper works 13 includes an engine (not shown), boom supports 14 and boom 20. A lift cylinder 16 and a master cylinder 17 are provided, lift cylinder 16 being a part of a conventional fluid system including a pump driven from the engine, and controlled by suitable control elements. The boom 20 is mounted for luffing movement, so that it may assume a desired inclination to the horizontal, being mounted on a horizontal pivot pin 18 carried by the boom support 14. The boom 20, as illustrated, is a two two-section boom, including a base section 21 and fly section 22. A hydraulic ram 23 is carried in the base section 21, and extends and retracts the fly section 22 in telescopic manner, fluid being delivered to the hydraulic ram 23 from a pump, and under suitable controls.

At the outer end of the fly section 22, there is provided a workman's platform or basket 30, which is supported for movement on vertical and horizontal axes, as will be described hereinbelow. The horizontal axis is defined by a pivot pin 24, which supports a pivot assembly 25. Connected to the pivot assembly 25 and to the fly section 22 is a slave cylinder 26, which is connected, in known fashion, to master cylinder 17, so as to maintain the floor of the workman's platform 30 level during luffing movement of the boom 20, in response to movement of lift cylinder 16. Supported on the workman's platform 30, which has a floor and upstanding walls for the safety of the workman, is a control console 31 which has a control lever **31*a* for causing luffing of the boom, control lever 31*b* for causing extension and retraction of the boom, and other controls, not shown, for causing rotation of the upper works 13 on a vertical axis, and driving and steering of the wheeled chassis 11**, all of which are conventional.

Figure 2:
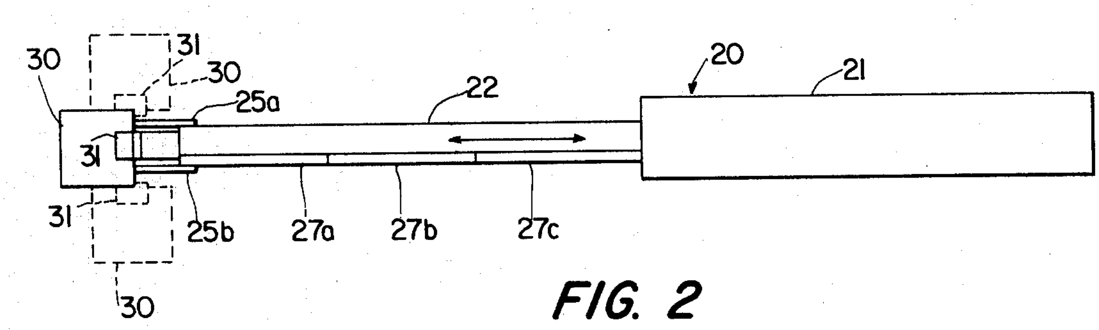
FIG. 2 is a plan view of the boom and platform of the workman's lift platform apparatus shown in FIG. 1.

Referring now to FIG. 2, the telescope boom 20 is shown in plan view, with the platform 30 at the outer end of the fly section 22 in alternate positions. The full line position is a neutral position, and the dotted line positions show the platform rotated 90° in either direction from the neutral position, so that the platform 30 will be seen to have a range of movement of substantially 180°, from side to side to the fly section 22 of the boom 20. Also shown in FIG. 2 are colored strips **27*a*, 27*b* and 27*c*, each strip being of a color which is different from and clearly distinctive from the other two strips. These strips provide a visual, color coding indicia of the extent to which the telescopic fly section 22 has been extended out of the base section 21. The color coded strips 27*a*, 27*b* and 27*c* are clearly visible to a workman standing in the workman's platform 30, and in position to manipulate the controls at the control console 31. As will be apparent, the colored strips 27*a*, 27*b* and 27*c* will be clearly visible to the workman in any position of the platform 30** upon rotation of it about the vertical axis.

Figure 3:
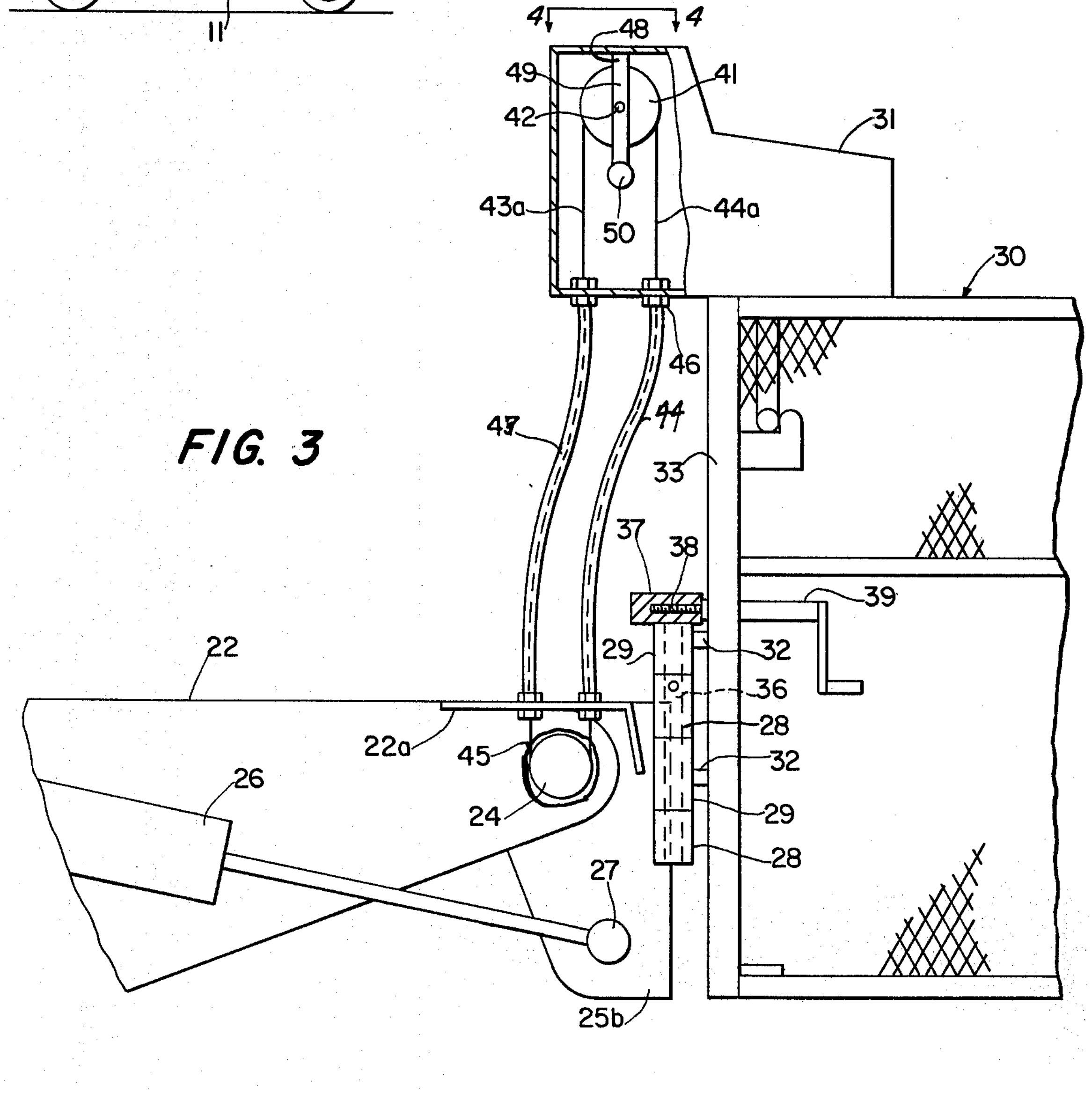
FIG. 3 is an elevational view, with parts in section, of a portion of the structure shown in FIG. 1.

In FIG. 3 there is shown the outer end of the fly section 22 and the slave leveling cylinder 26. The pivot assembly 25 comprises a pair of parallel, vertical plates **25*a* and 25*b* (see FIG. 2), plate 25*b* being shown in FIG. 3, with plate 25*a* removed. The piston rod of cylinder 26 is connected by pin 27 to the pivot assembly 25, to cause horizontal pivoting movement thereof about pivot pin 24. In addition, a vertical pivoting connection is provided by a pair of spaced, aligned cylinders 28 which are secured, as by welding, to the plates 25*a* and 25*b*. Alternate aligned and spaced cylinders 29 are connected by lugs to a support frame 33 for the structure of the workman's platform 30. A pivot pin 34 extends through the aligned cylinders 28 and 29, being fixed to the cylinder 28 by a transverse pin 36, and carrying at its upper end a gear 37: a worm 38 is in mesh with the gear 37, and is carried by a crank 39. Consequently, upon rotation of the crank 39, worm 38, in engagement with the gear 37, will cause rotary movement about the axis of pivot pin 34 of the platform 30**.

Shown mounted in the control console 31 is an indicator plate in the form of a drum 41 which is mounted on an axle 42 which is parallel to the axis of pivot pin 24, when the platform 30 is in the full line position shown in FIG. 2, which is the position shown in FIG. 3. In order to drive the drum 41, so as to rotate it an amount proportionately to the amount of rotation of the platform 30 about the axis of pivot pin 24, there are provided a pair of sheathed cables 43 and 44. The outer sheath of each of the sheathed cables 43 and 44 are secured, in known manner, to a plate **22*a* carried by the end of the fly section 22 of the boom, and the opposite ends thereof are secured to a plate 46 forming a part of the console 31. The inner cables 43*a* and 44*a* are secured to the periphery of the drum 41, and the opposite ends of these inner cables 43*a* and 44*a* are secured to a disc 45 which is rotatable with the platform about the axis of pivot pin 24 when the cylinder 26 is actuated to cause such pivoting movement. As it will be understood, the inner cables 43*a* and 44*a* will be caused to move through the sheaths, in a longitudinal manner, to cause the noted movement of drum 41 when the workman's platform 30 is rotated on pivot pin 24**.

A cursor 48 is supported by an arm 49 which is adjacent the drum 41; arm 49 has an aperture through it, by which it is mounted on the axle 42, and has at its lower end, opposite the cursor 48, a pendulum weight 50, so that the cursor 48 is gravity-operated in the known manner. The normal operation of the apparatus shown in FIG. 1 is for the operator to effect luffing of the boom 20 by causing fluid to be admitted to or exhausted from lift cylinder 16, and the movement of the boom 20 is sensed by the master cylinder 17, which controls slave cylinder 26 to effect automatic leveling of the platform 30. In some instances, however, it is desirable to independently actuate the slave cylinder 26, and controls are provided, in conventional manner, for such operation. In this case, the gravity operation of the cursor 48 will effect a proper reading of the safe load indicator, even though the platform 30 is not level. Further, while the length of the sheathed cables 43 and 44 are not shown in FIG. 3 of the drawings, it will be understood that they are of sufficient length to enable the platform 30 to be rotated about a vertical axis, to either side of the boom 20 as shown in FIG. 2.

Figure 4:
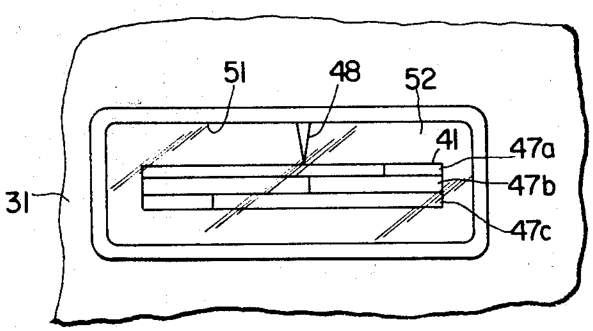
FIG. 4 is a view taken on the line 4—4 of FIG. 3.

In FIG. 4, there is shown an upper plate of the control console 31, there being an opening 51 in the plate, with a transparent plate 52 in the opening 51, the plate 52 revealing cursor 48. Also visible through the plate 52 is the indicator drum 41. The indicator drum 41 has three colored indicia strips **47*a*, 47*b* and 47*c*, corresponding to the colors of the color strips 27*a*, 27*b*** and 27*c* on the boom fly section 22. Each of the strips 47*a*, 47*b* and 47*c* may be divided into zones, with each zone containing an indication of a load capacity, such as "500 lb.", "600 lb.", etc.

When the workman in the workman's platform 30 causes the boom 20 to luff, that is, to pivot about the pivot pin 18, it will have a given angle to the horizontal. Due to the leveling system of the platform 30 provided by the master cylinder 17 and the slave cylinder 26, the floor of the platform 30 will remain horizontal, so that the angle of the boom 20 relative to the horizontal is provided either by reference to the ground, or to the floor of the platform, which is parallel to the ground. The amount of movement of the boom 20 about the pivot pin 18 will be equal to the amount of movement of the platform 30 about the pivot pin 24. This latter movement is caused to move the indicator drum 41, proportionately to the amount of said movement, by the sheathed cables 43 and 44. Consequently, the angle of inclination of boom 20 is indicated by the position of indicator drum 41 relative to cursor 48. The workman in the workman's platform 30, at the control console 31 and controlling luffing and extension of the boom 20 will note the amount of extension of the fly section 22 by observing the color coding indicia provided by the colored strip 27*a*, 27*b* or 27*c* which is visible at the end of the base section 21. Observing that particular color, and glancing, then, at the corresponding color strip 47*a*, 47*b* or 47*c* on the indicator drum 41 which is opposite the cursor 48, he is directed to the proper portion of the indicator drum 41 to thereby gain an automatic identification of the particular amount of extension, by zone, of the fly section 22. The amount of rotation of the indicator drum 41, corresponding to the inclination of the boom 20, is indicated by the cursor 48, so that thereby the two factors of boom extension and boom elevation are proportional correspondence to the particular colored indicator strip 47*a*, 47*b* or 47*c* on the indicator drum 41 and by the amount of rotation of indicator drum 41, respectively.

As will be understood, the herein disclosed apparatus provides an indication of load capacity of the workman's platform apparatus at a given boom elevation and extension, and within zone limits. For example, there is shown in color coded strip 47*b* two zones, one of which may indicate a capacity of 500 pounds and the other which may indicate a capacity of 600 pounds. As will be apparent, a slight change in boom angle will not change the safe load in a substantial amount. Therefore, the zones are chosen to provide a suitable margin of safety.

The control panel 31, being fixed to the workman's platform 30, moves with it, and, therefore, when the workman's platform 30 has been rotated about the vertical axis provided by the vertical pivot pin 34, the colored indicator strips 27*a*, 27*b* and 27*c* will always be visible, depending, of course, on the amount of extension of fly section 22, to the workman at the control console 31. Regardless of the angular position of the workman's platform 30 on the vertical axis, the indicator drum 41 will be driven by the cables 43 and 44 so as to be in position relative to the angle of inclination of the boom 20, and, as will be understood, these cables 43 and 44 will not be affected by the angular position of the workman's platform 30 as it is horizontally rotated, but will cause the indicator drum 48 to move, regardless of the horizontal position of the workman's platform 30.

Figure 5:
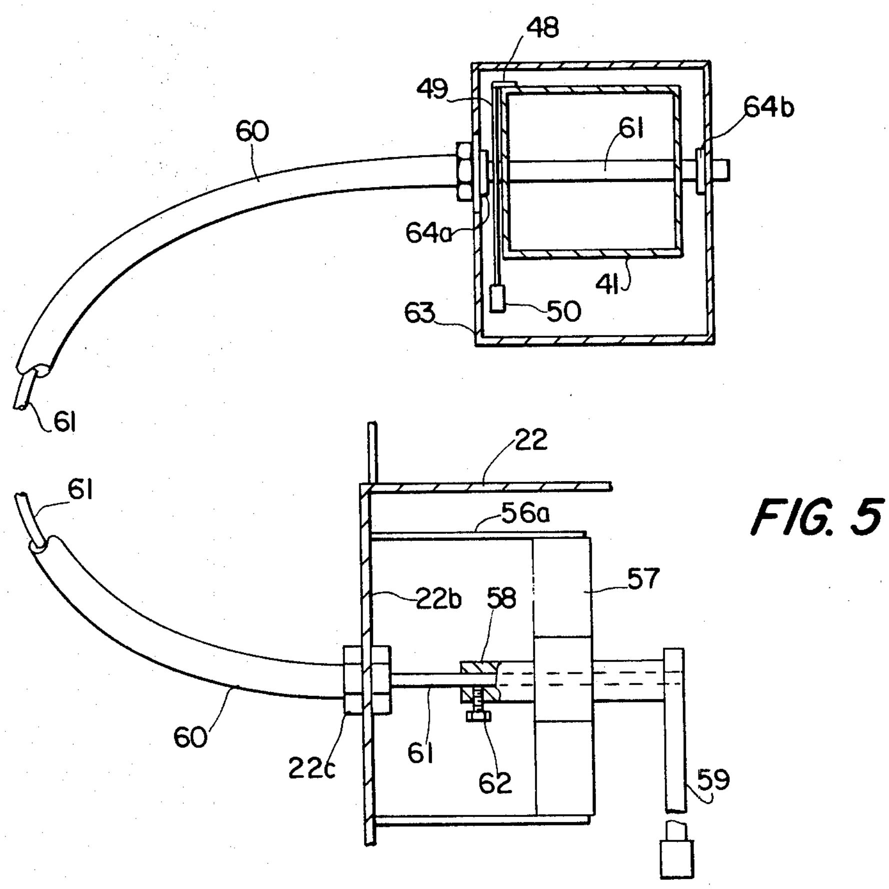
FIG. 5 is a cross sectional view, partly schematic, of an alternate embodiment of a safe load indicator in accordance with the present invention.

Referring now to FIG. 5, there is shown an alternate embodiment of the apparatus in accordance with the present invention, in somewhat schematic form. A plate 22*b* will be seen extending downwardly from the bottom of boom 22, the bottom plate and one side plate of which are particularly shown in cross section. A pair of bracket arms 56*a* and 56*a* support a bearing 57, through which passes a shaft 58. The axis of shaft 58 is horizontal, and is parallel to the axis of pivot pin 24. At one end, the shaft 58 has a pendulum 59 connected to it, and at its other end, the shaft 58 receives the inner cable 61 of a sheathed cable 60. Inner cable 61 is secured to shaft 58, as by a set screw 62, so as to rotate with shaft 58. The outer sheath of sheathed cable 60 is attached in known manner to the plate 22*b*, the inner cable 61 passing through an aperture 22*c* in plate 22*b*.

Also shown in FIG. 5 is a housing 63 in which is located an indicator drum 41, supported by an end portion of the inner cable 61. The inner cable 61 may be seen to pass through suitable bearings 64*a* and 64*b* carried in the console 63. Mounted on the terminal portion of the inner cable 61, adjacent indicator drum 41, is an arm 49 carrying a cursor 48, and a pendulum weight 50.

In operation, when the boom 22 is luffed, the pendulum 59 will rotate, thereby rotating inner cable 61 and causing the indicator drum 41 to rotate proportionately.

As will be understood, the indicator drum 41 and cursor 48 will be seen, in the embodiment in FIG. 5, in substantially the same manner as is shown in FIG. 4 in connection with the embodiment of FIGS. 1-3.

Figure 6:
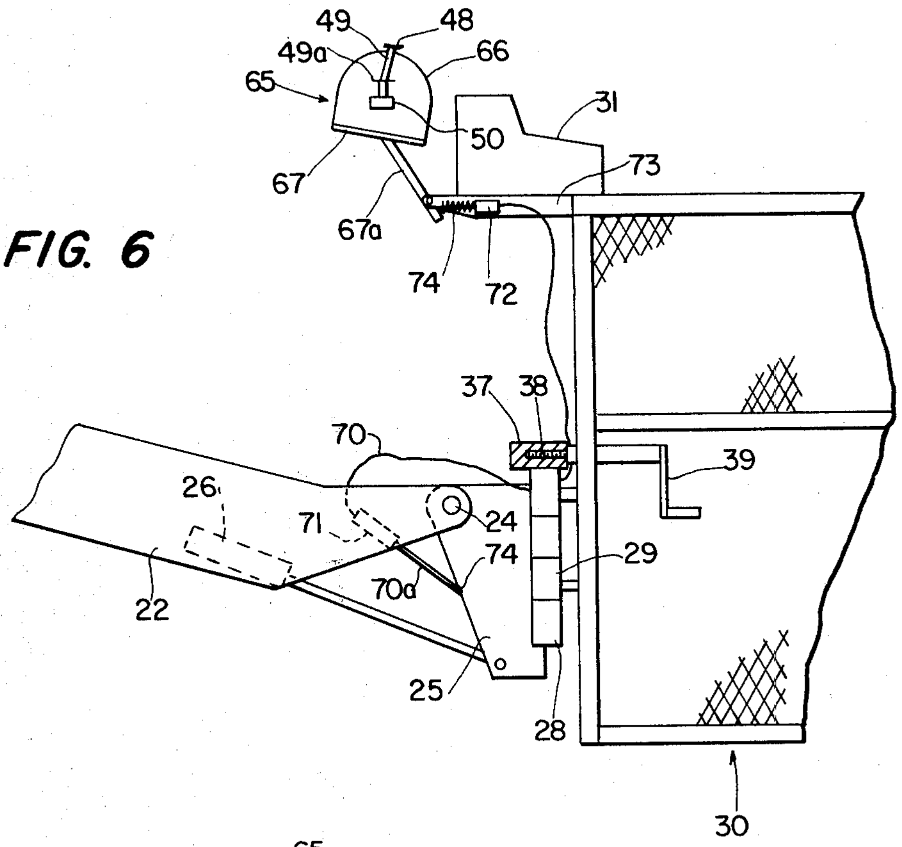
FIG. 6 is an elevational view, similar to FIG. 3, and showing an alternate embodiment of the invention.

Referring now to FIG. 6, there is shown an alternate embodiment of the safe load indicator. The boom 22 will be seen to carry a platform support 25 by a pivot pin 24, with movement of the support 25 effected by a slave cylinder 26. There may also be seen the same vertical pivot support structure 28, 29, as shown in FIG. 3, together with gear 37, worm 38 and crank 39. The console 31 for the various control elements is shown, and to the left of it is an indicator housing 65, including an arcuate indicator plate 66, which is similar in construction to the portion of the indicator drum 41 shown in FIG. 4. The housing 65 is carried on a support 67, which is pivotally connected at horizontal pivot 68, which extends parallel to the axis of pivot pin 24, when the workman's platform 30 is in the neutral position shown in full lines in FIG. 2. A cursor 48 is provided, carried on an arm 49 and having a weight or pendulum 50 at is lower end. Arm 49 may be supported by a shaft 49*a* extending through the housing 65, and supported by it, so as to be parallel to the axis of pivot pin 24. The support 67, which may include the arm 67*a*, is moved proportionately when the boom 22 is luffed, by a sheathed cable 70, the sheath of which is secured, as by a bracket 71, to the boom 22, the other end of the sheath being secured by a bracket 72 to a support 73 for the console 31. The inner cable 70*a* is attached by a bracket 74 to the platform support 25, at one end, and its other end is connected to the arm 67*a*. A spring 74 may be used to urge the upper end of inner cable 70*a* to the left, as shown in FIG. 6.

As will be understood, the arcuate indicator plate 66 has as its center the axis of the axle 49*a*.

In operation, as the boom is luffed, the sheathed cable 70 will have the inner cable 70*a* thereof moved longitudinally through it, to thereby cause proportionate rotational movement of the housing 65, to enable a workman in the platform 30 to read the safe load, in known manner. The platform 30 may be rotated on a vertical axis through the cylinders 28, 29, in the same manner as the structure shown in FIG. 3, and the indicator housing 65 will always be in position to be read by the workman on the platform.

Figure 7:
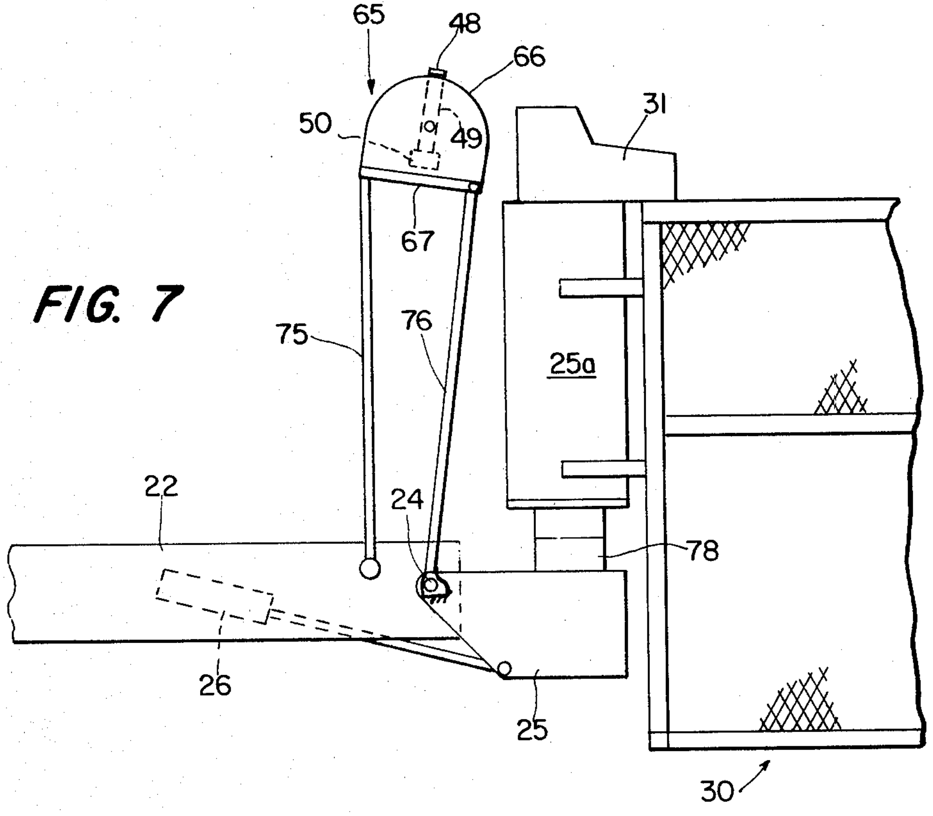
FIG. 7 is an elevational view, similar FIG. 3, and showing a still further embodiment of the present invention.

Referring now to FIG. 7, there is shown the indicator housing 65 with indicator plate 66 and cursor 48, substantially the same as shown in FIG. 6. The support 67 for the indicator housing 65 is carried by parallel bar linkage, including bar 75 pivotally connected at its ends to the boom 22 and support 67, respectively and bar 76 having its upper end pivotally connected to support 67, and its lower end rigidly connected to the support 25. Mounted on support 25 is a hydraulic motor 78, of known construction. Motor 78 is of generally cylindrical configuration, having a lower section secured to the support 25, and the upper section, which is rotational with respect to the lower section, being secured to an auxiliary support structure 25*a*. Thus, by the operator supplying fluid to the rotary hydraulic motor 78, the platform 30, with console 31, may be caused to rotate about a vertical axis through the motor 78. The platform may be moved from side to side of the boom 22, in the manner shown in FIG. 2. Such construction is generally similar to that shown in Grove U.S. Pat. No. 3,809,180.

In operation, when the slave cylinder 26 causes the platform 30 to pivot about pivot pin 24, the parallel bar linkage 75, 76 will cause the indicator housing 65 to rotate in a similar manner, and the cursor 48, under the action of the pendulum weight 50, will provide a true indication of the safe load which may be carried by the platform 30 in the particular extension and angularity of the boom 20.

It will be obvious to those skilled in the art that various changes may be made without departing from the spirit of the invention, and therefore the invention is not limited to what is shown in the drawings and described in the specification but only as indicated in the appended claims.

We claim:

1. In a workman's lift platform apparatus comprising a telescopic boom pivotally mounted for luffing movement about a horizontal axis and having base and fly sections, means for extending and retracting the telescopic boom, means for luffing the boom, a workman's platform adjacent the outer end of the boom, a horizontal pivotal connection between the platform and the boom parallel to said horizontal axis, means for maintaining the platform level during luffing movement of the boom, and control means on the workman's platform for controlling boom luffing and boom extension, the improvement comprising:

- means on the fly section of the boom visible to a workman at said control means for visually indicating the amount of extension of the boom,
- an indicator drum on said platform adjacent said control means having thereon visual indicating means corresponding to the indicating means on said boom fly section, means for supporting said indicator drum on a horizontal axis parallel to said first mentioned horizontal axis,
- means for driving said drum proportionately to the angle of the boom to the horizontal comprising cable means connected at one end to said drum and at the other end to said boom, and
- a cursor adjacent said indicator drum.

2. Apparatus according to claim 1, wherein said cursor is supported by an arm pivoted intermediate its ends on said drum support means, said arm having a weight thereon opposite said cursor.

3. Apparatus according to claim 2, wherein said control means comprises means for effecting movement of said platform about the horizontal pivotal connection thereof to said boom when said boom is stationary, whereby the drum and cursor will both move to provide an accurate indication of the load capacity of the apparatus.

4. Apparatus according to claim 1, wherein said cable means comprises an outer sheath means and inner cable means.

5. Apparatus according to claim 4, wherein said cable means comprises a pair of sheathed cables fixed to said drum and fixed to an element rotatable with said platform about said horizontal axis.

6. Apparatus according to claim 5, and a plate secured to said boom adjacent the outer end thereof, a second plate carried by said platform adjacent said drum, the sheaths of said cables each having one end connected to one said plate, and each has the other end connected to the other said plate.

7. Apparatus according to claim 4, means mounting said platform for rotation about a vertical axis adjacent the end of said boom from side to side of said boom, means for rotating said platform about said last mentioned axis, said cable means having length sufficient to permit said movement of said platform about said last mentioned axis.

8. Apparatus according to claim 4, wherein said cable means comprises an outer sheath and an inner, torsion transmitting cable, one end of said cable connected to said drum, and a pendulum connected to the other end of said cable.

9. Apparatus according to claim 8, means connecting one end of said sheath to said boom, and means connecting the other end of said sheath to a housing for said drum.

10. Apparatus according to claim 9, a bearing carried by said boom on a horizontal axis parallel to said first mentioned horizontal axis, a shaft in said bearing, said pendulum connected to said shaft, and said torsion cable connected to said shaft.

11. In a workman's lift platform apparatus comprising a telescopic boom pivotally mounted for luffing movement about a horizontal axis and having base and fly sections, means for extending and retracting the telescopic boom, means for luffing the boom, a workman's platform adjacent the outer end of the boom, a horizontal pivotal connection between the platform and the boom parallel to said horizontal axis, means for maintaining the platform level during luffing movement of the boom, and control means on the workman's platform for controlling boom luffing and boom extension, the improvement comprising:

- means on the fly section of the boom visible to a workman at said control means for visually indicating the amount of extension of the boom,
- an arcuate indicator plate on said platform adjacent said control means having thereon visual indicating means corresponding to the indicating means on said boom fly section,
- a cursor,
- means mounting said cursor adjacent said arcuate plate for rotational movement about the axis of said arcuate plate,
- a pendulum weight on said cursor,
- means for mounting said indicator plate on said platform for pivotal movement about a horizontal axis parallel to said first mentioned horizontal axis, and means for maintaining said indicator plate in a predetermined orientation relative to said boom when said boom is luffed about said horizontal axis to different angular positions.

12. The apparatus of claim 11, means mounting said platform for rotation about a vertical axis adjacent the end of said boom from side to side of said boom, and means for rotating said platform about said last mentioned axis.

13. The apparatus of claims 11 or 12, said indicator plate maintaining means comprising sheathed cable means.

14. The apparatus of claim 13, said last mentioned means comprising a sheathed cable having one end of the sheath secured to said boom and the other end of said sheath secured to said platform, said cable of said sheathed cable having one end secured to an element movable with said platform when said platform pivots about said pivotal connection, and means connecting the other end thereof to said indicator plate.

15. The apparatus of claims 11 or 12, said indicator plate maintaining means comprising parallel bar means.

16. The apparatus of claim 15, said parallel bar linkage means comprising a first bar pivotally connected to said boom and means supporting said indicator plate, and a second bar rigidly connected at one end to an element movable with said platform when said platform pivots about said pivotal connection, and pivotally connected at the other end to said means supporting said indicator plate.

* * * * *